(12) United States Patent
Lee (10) Patent No.: US 6,181,325 B1
(45) Date of Patent: Jan. 30, 2001

(54) COMPUTER SYSTEM WITH PRECISE CONTROL OF THE MOUSE POINTER (75) Inventor: Kyung-Sup Lee, Suwon (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 09/022,029

(22) Filed: Feb. 11, 1998

(30) Foreign Application Priority Data

Feb. 14, 1997 (KR) ..................................................... 97-4379

(51) Int. Cl.⁷ ................................. G09G 5/00; G09G 5/08
(52) U.S. Cl. .......................... 345/157; 345/156; 345/160
(58) Field of Search ................................... 345/173, 145, 345/167, 130, 156, 157, 160, 163; 395/800

(56) References Cited

U.S. PATENT DOCUMENTS

| 5,187,776 | 2/1993 | Yanker . | |
|---|---|---|---|
| 5,239,665 | * 8/1993 | Tsuchiya ............................. | 395/800 |
| 5,469,194 | * 11/1995 | Clark et al. ......................... | 345/173 |
| 5,508,717 | 4/1996 | Miller . | |
| 5,565,888 | 10/1996 | Selker . | |
| 5,661,502 | 8/1997 | Cheng . | |
| 5,689,284 | * 11/1997 | Herget ................................. | 345/145 |
| 5,703,620 | 12/1997 | Keyson . | |
| 5,710,574 | 1/1998 | Jaaskelainen, Jr. . | |
| 5,726,684 | * 3/1998 | Blankenship et al. ............... | 345/167 |
| 5,856,821 | * 1/1999 | Funahashi ........................... | 345/130 |

* cited by examiner

Primary Examiner—Vijay Shankar
(74) Attorney, Agent, or Firm—Robert E. Bushnell, Esq.

(57) ABSTRACT

A portable computer system enables locating the mouse pointer precisely on the monitor screen. The computer system includes a pointing device such as a touch pad mounted at top surface of the main body with two mouse buttons. A button is provided at left sides of the touch pad. This button is similar to the mouse button and used when fine adjustment of the mouse pointer is needed. The operation of the fine adjustment mode performed in the computer are as follows: determining whether a fine adjustment mode selection key is pressed; zooming in a predetermined screen area including current location of the pointer based on the corresponding video driver and operating system; locating the pointer at the desired position within the zoom in screen; checking if the fine adjustment mode has canceled; and restoring the zoom in screen to original picture if the fine adjustment mode is canceled. The cancellation of the fine adjustment mode is performed by detecting the signal fed from one of the mouse buttons.

11 Claims, 9 Drawing Sheets

COMPUTER SYSTEM WITH PRECISE CONTROL OF THE MOUSE POINTER

CLAIM OF PRIORITY

This application makes reference to, incorporates the same herein, and claims all benefits accruing under 35 U.S.C. § 119 from an application for A Computer System With Precise Control Of The Mouse Pointer earlier filed in the Korean Industrial Property Office on Feb. 14, 1997 and there duly assigned Serial No. 4379/1997.

FIELD OF THE INVENTION

The present invention relates to computer systems, and more particularly to a portable computer system capable of locating the mouse pointer precisely on the monitor screen.

BACKGROUND OF THE INVENTION

Conventionally, personal computers are equipped with pointing devices as peripheral device for enabling input of coordinate data, selection of a menu, moving of an object, and so forth. The typical pointing device may include a mouse, touch pad, track point, track ball, and pointing stick. The mouse is widely used in desktop computers for its fine sensitivity and resolution. Instead of the mouse, a track ball, track point, and touch pad have been used in portable computers such as a notebook computer for their compactness fit for the smaller size of the portable computer. The pointing devices are incorporated into the main body of the notebook computer to perform corresponding mouse function. Buttons are provided on the surface of the main body to be pressed or clicked manually and to control certain functions that may be customized to suit the user.

However, it is common to users of the notebook computers that the use of the track ball or touch pad is inconvenient and less precise compared with the mouse. Particularly, it is difficult for a novice to locate a pointer at fine position on screen, since movement of the pointer made by a finger is instable. To control movement of the mouse pointer precisely in the notebook computer, either changing the mouse resolution to higher one or adjusting the mouse pointer speed slowly is needed. The adjustment of the pointer speed should be performed through the corresponding control program each time it is required to fit for the use. Change of the mouse resolution as well as adjustment of the mouse operation is troublesome and time consuming.

U.S. Pat. No. 5,565,888 for a Method And Apparatus For Improving Visibility And Selectability Of Icons to Selker discloses a display enhancement scheme that expands the size and the selection zone of icons when a pointer falls within a vicinity of the icon. This arrangement for enlarging the size of the icons is automatic and does not require the user to press a button or use a complicated display menu to enlarge the size of the icons. The enlargement of the icons is out of the control of the user as the user is not required to press any buttons to cause the icon to become enlarged. U.S. Pat. No. 5,187,776 for an Image Editor Zoom Function to Yanker discloses a user controlled ZOOM function that enlarges the region of the screen surrounding the cursor. Yanker requires the user to depress CNTR-Z to activate the ZOOM function and the ESC key to deactivate the ZOOM function. Yanker uses an image editor to activate and deactivate the ZOOM function. What is needed is an arrangement where the user can enlarge the screen in the vacinity of the pointer. What is also needed is a single key that both activates and deactivates the ZOOM function. Finally, what is needed is the above to be carried out without the use of an image editor.

SUMMARY OF THE INVENTION

It is therefore an object of the present invention to provide an improved arrangement where images in the vicinity of the pointer become enlarged when a button is pushed.

It is also an object to provide a single button that both activates and deactivates the ZOOM function of the display image in the vicinity of the pointer.

It is yet another object to provide a computer system which is capable of controlling movement of the mouse pointer precisely without changing the mouse resolution or pointer speed.

It is still yet another object to provide a computer system that can enlarge the image in the vicinity of the pointer and reduce the image in the vicinity of the pointer without using an image editor.

In accordance with one aspect of the present invention, there is provided with a computer system which comprises a display apparatus for displaying graphic data in a predetermined graphic mode; a pointing device for moving the pointer that indicates a position on screen; a function key designated for selecting or deselecting a pointer fine adjustment mode; a microcontroller in response to key input signal fed from the function key to generate a signal notifying the pointer fine adjustment mode is being selected or deselected; and a central processing unit in response to the signal supplied from the microcontroller to issue a command that allows the display apparatus to display screen such that a predetermined area including current location of the pointer is enlarged.

In the preferred embodiment of the invention, the pointing device is a touch pad. Further, the function key is mounted at left or right side of the mouse pad. Preferably, the size of the pointer in the enlarged screen remains unchanged.

In accordance with another aspect of the present invention, there is provided with a method for locating the mouse pointer precisely on a display screen, which method comprises determining whether a fine adjustment mode selection key is pressed; zooming in a predetermined screen area including current location of the pointer based on the corresponding video driver and operating system; locating the pointer at the desired position within the zoom in screen; checking if the fine adjustment mode has canceled; and restoring the zoom in screen to original picture if the fine adjustment mode is canceled. According to this invention, the inventive method provides for a precise and easy control of the mouse pointer in the high resolution graphic mode, without changing the mouse resolution or pointer speed.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
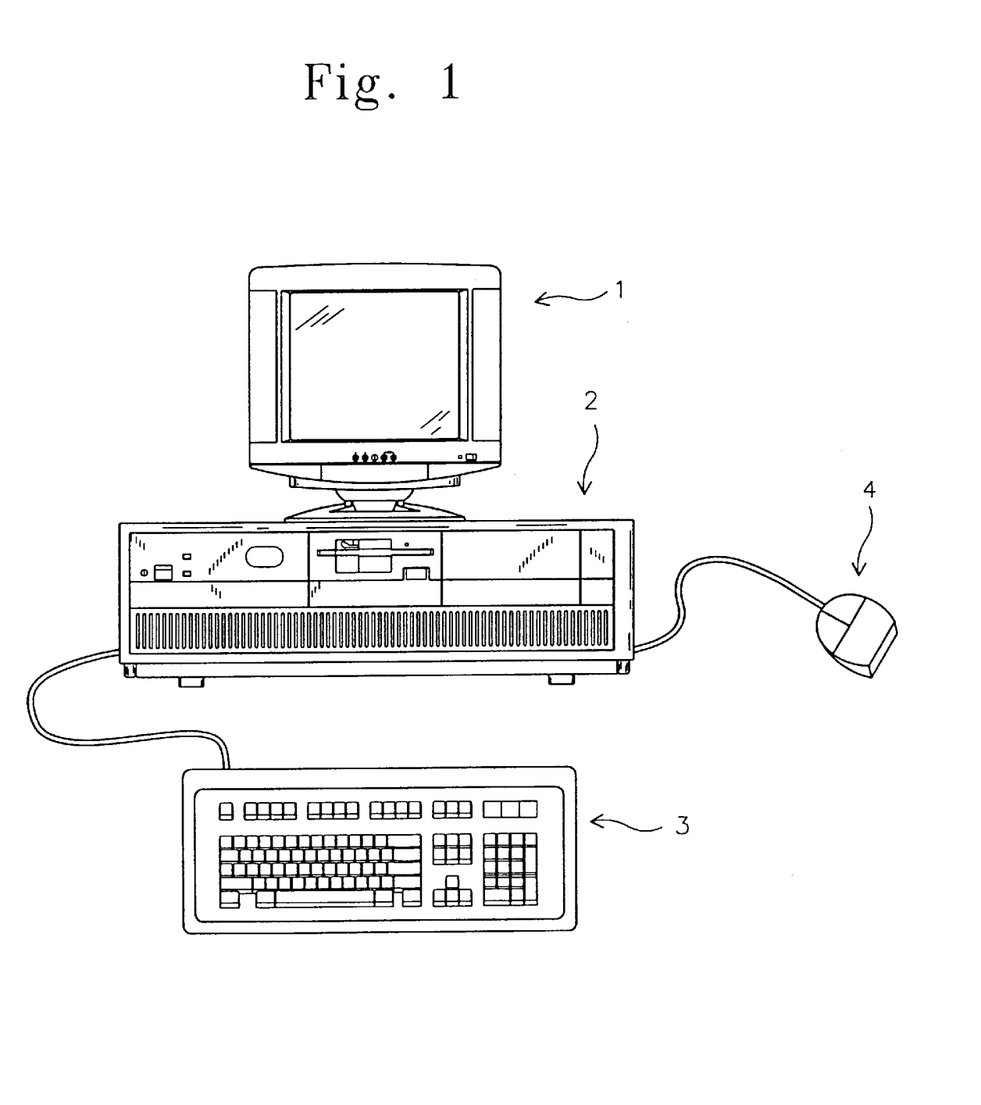
FIG. 1 is an isometric view of a PC providing an environment within which a mouse is used as pointing device.

FIG. 1 shows a conventional desktop personal computer which employs a mouse as the pointing device. The computer 2 includes a keyboard 3 and a mouse 4 as input devices, and a display unit 1 as output device. The mouse 4 enables inputting of coordinate data and performing various function supported by related mouse driver programs installed in the computer 2. A cursor or pointer is generated and it is presented on the screen of the display 1. As the mouse 4 moves on the desktop, the pointer is moved and indicate a position on screen where characters will be inserted or a selection is made. Also, buttons are provided in the mouse 4 to be pressed or clicked manually and to control certain functions that are customized to suit the user. Most of all, it is important that the mouse pointer should designate a position on screen precisely so that the desired insertion point or selection position may be found. The mouse 4 is known to have fine sensitivity and resolution compared to the one mounted in portable computers.

Figure 2:
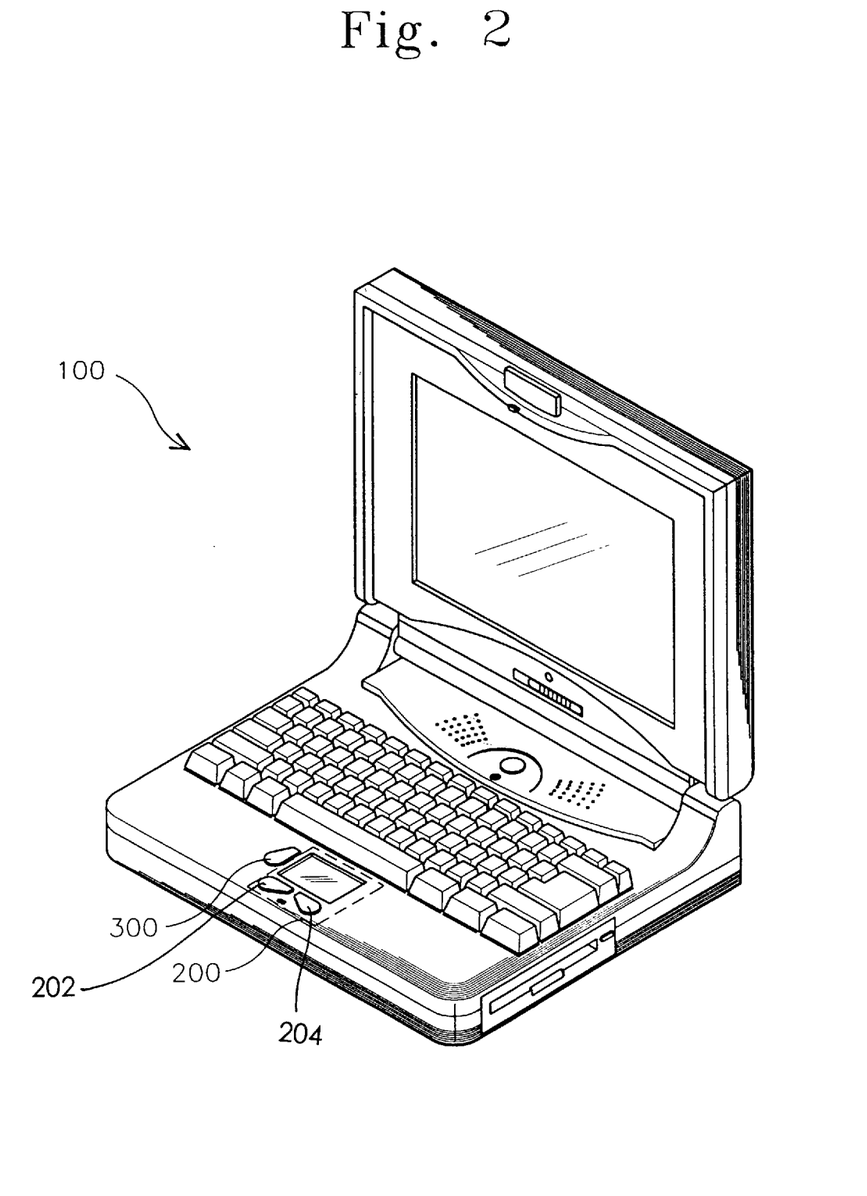
FIG. 2 is an isometric view of a portable computer employing the pointing device in accordance with the present invention.

In portable computers, a track ball, track point, and touch pad are used instead of the mouse. For example, notebook computers usually adopt the touch pad for its flat and compact structure. As shown in FIG. 2, a notebook computer 100 is provided with a touch pad 200 mounted at top surface of the main body with two mouse buttons 202 and 204. A button 300 is provided at left sides of the touch pad 200 in accordance with the present invention. This button 300 is similar to the mouse button and used when fine adjustment of the mouse pointer is needed. The operation of the fine adjustment mode will be described hereinafter.

Figure 3:
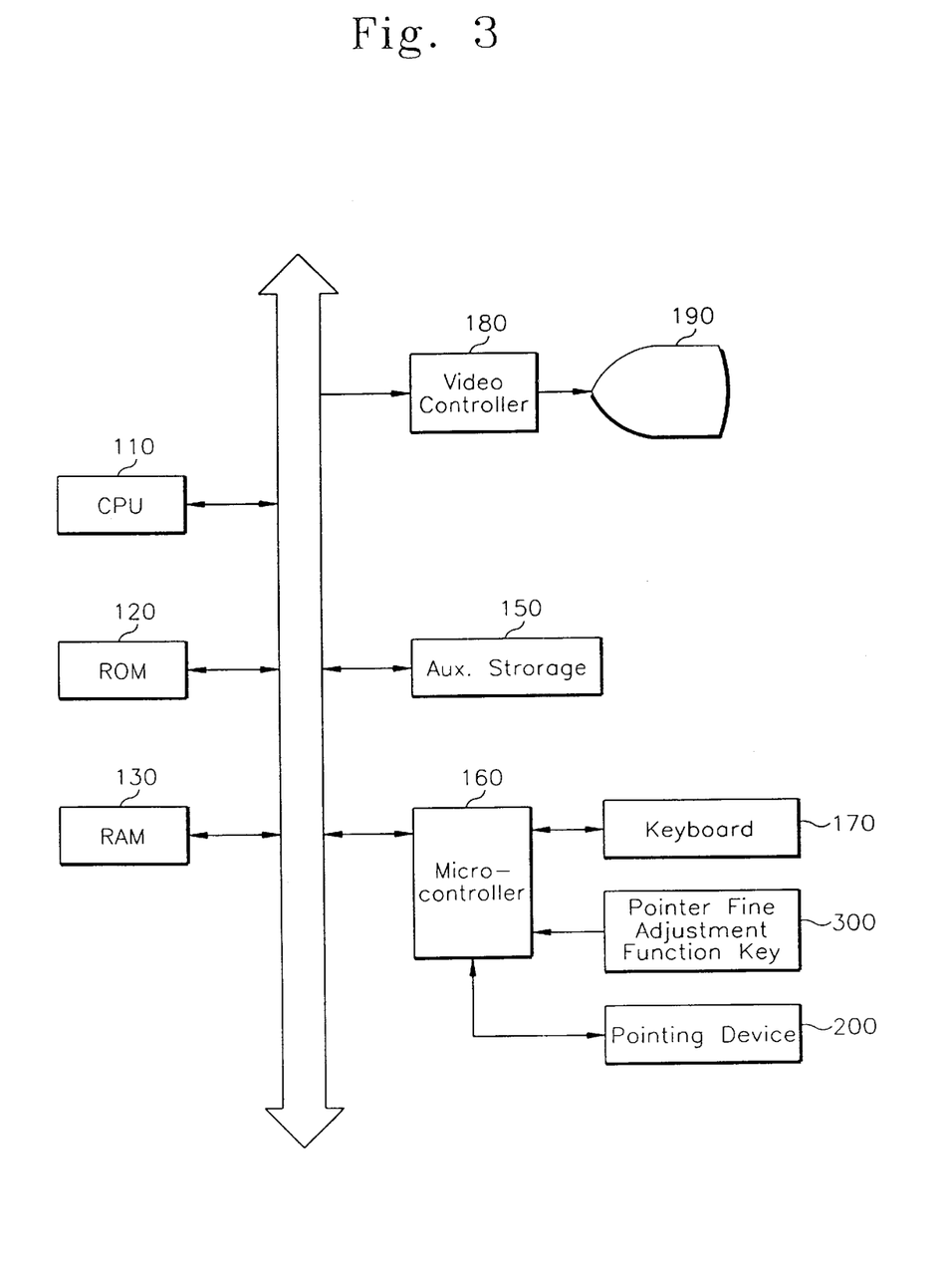
FIG. 3 is a block diagram of the computer system adopting a microcontroller for the pointing device in accordance with the invention.

FIG. 3 shows a configuration of the notebook computer system with which the pointing device of the invention is incorporated. The computer system includes a central processing unit 110, a ROM 120, a RAM 130, an auxiliary storage 150, a video controller 180, and a display unit 190. System buses are provided to interconnect the components of the computer. The computer system further includes a microcontroller 160 coupled to the system bus. Inputs of the microcontroller 160 is coupled to a keyboard 170, a pointing device or touch pad 200, and a fine adjustment mode select button 300. The screens of the monitor provide a variable visual display of images and symbols under the control of central processing unit 110.

In this computer system, if the button 300 is pressed, the microcontroller 160 recognizes the signal fed from the button 300 and outputs a signal to the central processing unit 110 notifying that the fine adjustment mode is being invoked. Then the central processing unit 110 issues a command that allows the video controller 180 to display screen such that a predetermined area including current location of the pointer is enlarged. In this fine adjustment mode, the size of the pointer in the enlarged screen remains unchanged. This permits easy location of the pointer at fine position on screen although movement of the pointer made by a finger is instable. This will also eliminate change of the mouse resolution or adjustment of the mouse pointer speed. Also, the fine adjustment mode is operated by concurrent supporting of the mouse driver, video driver, and operating system in the computer system.

Figure 4:
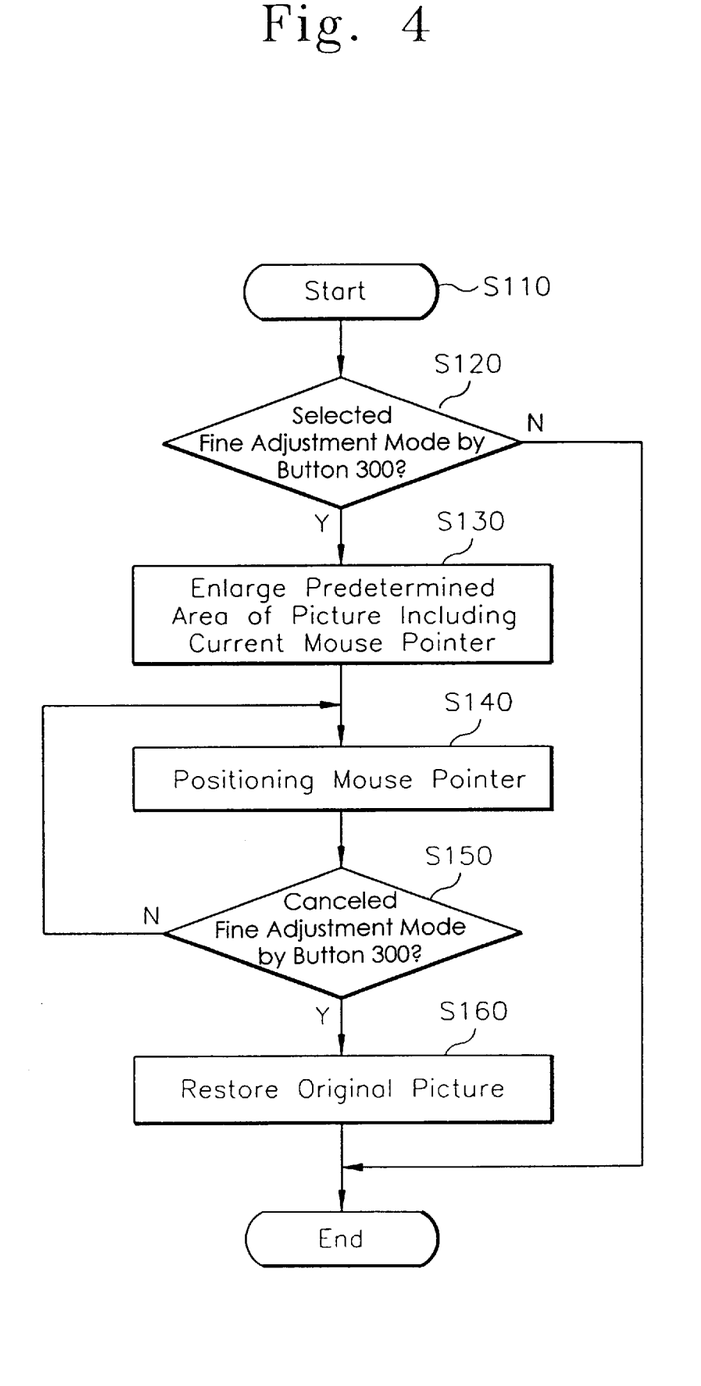
FIG. 4 is a flow chart representing operation of the pointer fine adjustment mode performed in the computer in accordance with one embodiment of the invention.

FIG. 4 shows detailed operation of the fine adjustment mode performed in the computer according to one embodiment of the invention. The fine adjustment mode routine is initiated when the fine adjustment mode select button 300 is pressed. At step 120, a determination is made whether the fine adjustment mode is selected. If the button 300 is pressed, the central processing unit 110 detects the button signal fed from the microcontroller 160 and recognizes the selection of the fine adjustment mode. Then, the central processing unit 110 issues a command that urges the video controller 180 to zoom in or enlarge a predetermined screen area including current location of the pointer based on the corresponding video driver and operating system. In this case, it is preferred that the pointer be moved adjacent to the desired position in advance and that the size of the pointer maintain its original size.

Next, locating the pointer at the desired position within the enlarged screen is performed at step 140. Once the pointer is moved to the desired position, a selection by the mouse is made by clicking mouse button 202 or 204, dragging the mouse, or double clicking one of mouse buttons 202 or 204. After a mouse function has performed, the central processing unit 110 then checks if the fine adjustment mode has canceled by detecting another signal fed from the button 300 at step 150. The signal can be generated for example by clicking again the fine adjustment mode select button 300. If the cancel signal has detected, the central processing unit 110 urges the zoom in screen to be reduced to its original size at step 160.

Figure 5A:
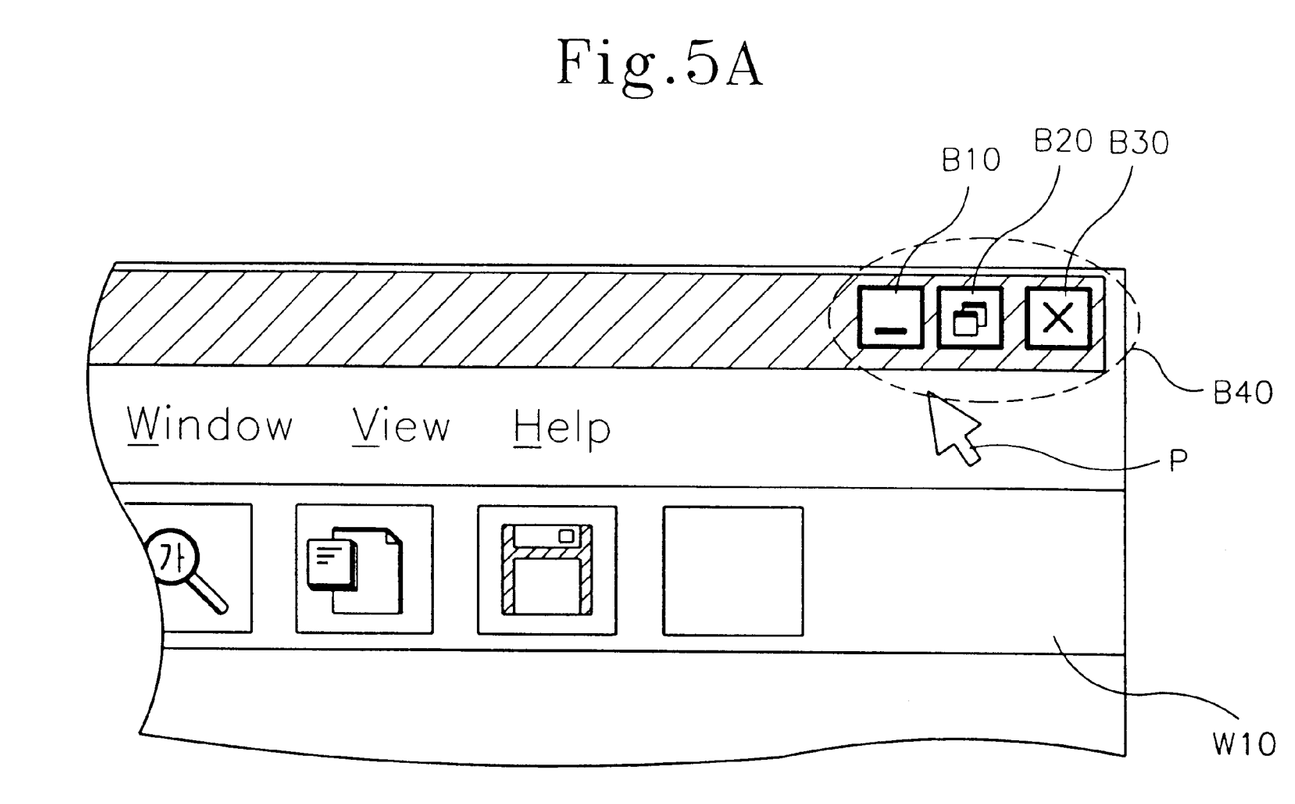
FIGS. 5A to 5D are schematic representations showing an example of the fine adjustment operation of the mouse pointer in accordance with the invention.
Figure 5B:
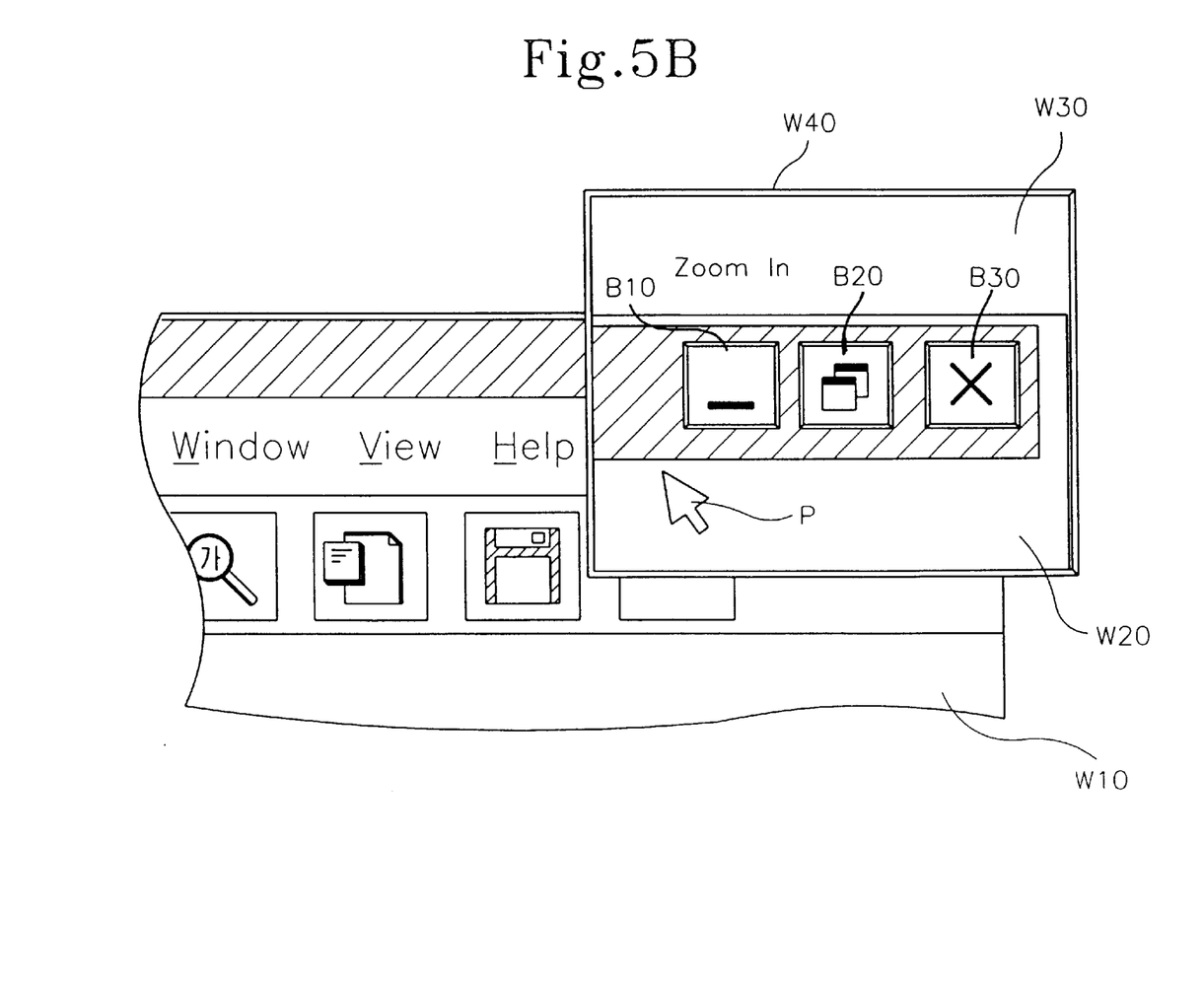
Figure 5C:
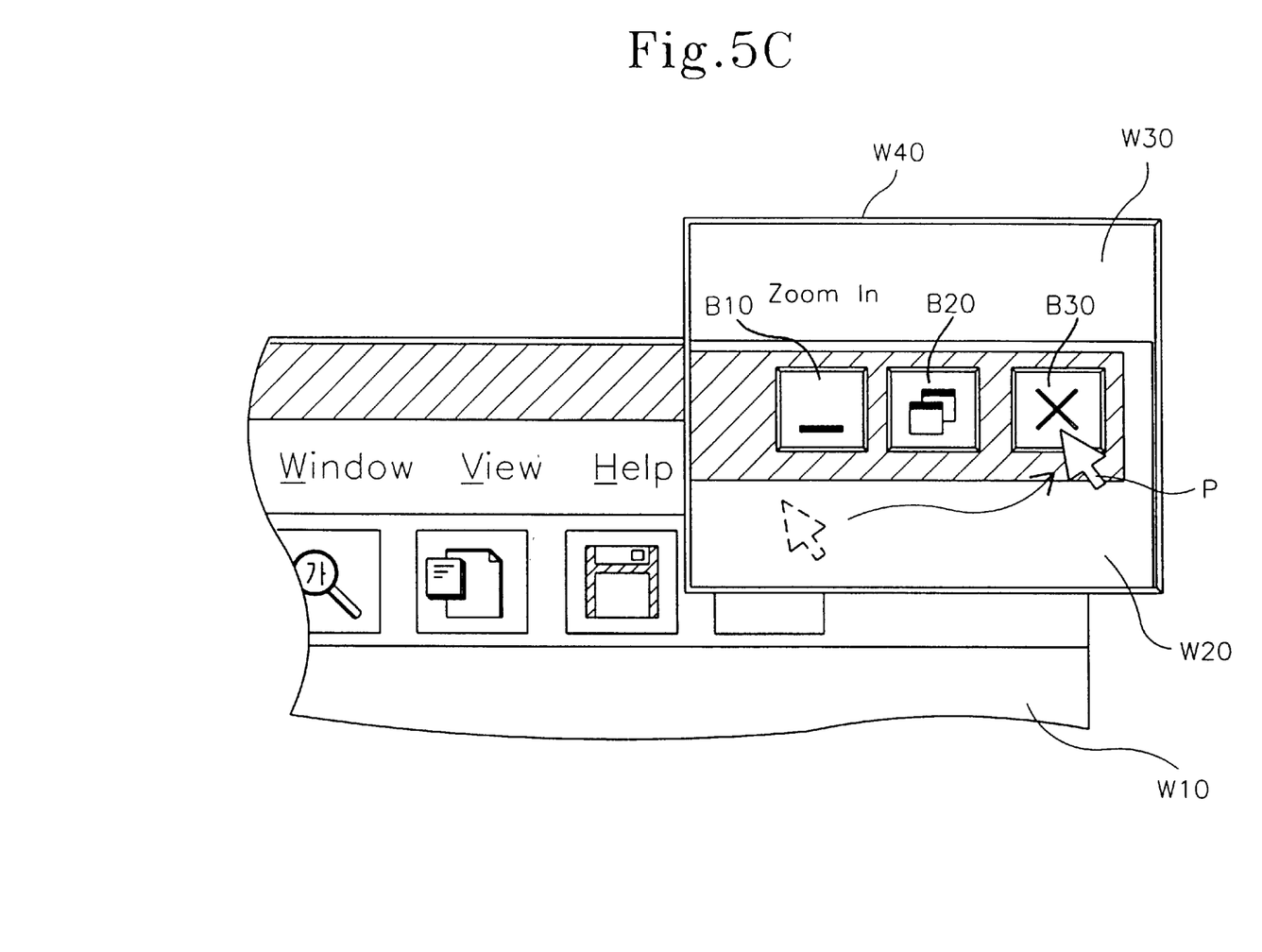
Figure 5D:
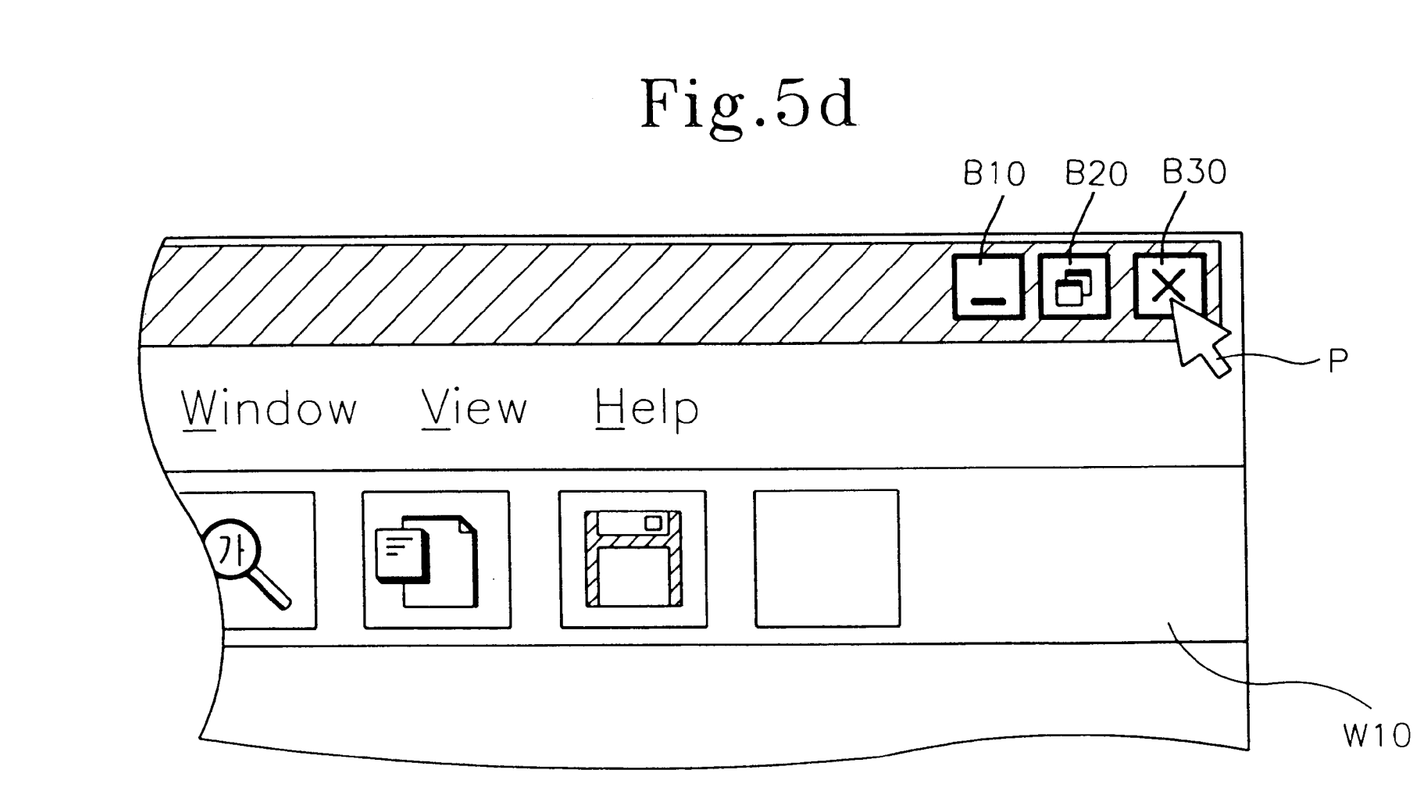

FIGS. 5A to 5D depict the zoom in screen and pointer location procedure in an application program according to the fine adjustment operation shown in FIG. 4. In FIG. 5A, provided that the user attempt to locate the pointer P at quit button B30 placed on right edge of a window title bar, the pointer may be moved adjacent to the button area B40. Reference numerals B10 denotes iconize button, B20 denotes restore or reduce button, and W10 denotes a tool bar of the application program. Mode of the zoom in screen is exemplified by FIG. 5B. Zoom in window W40 is appeared above the button area B40 when the fine adjustment mode selection button 300 is pressed. In the zoom in window W40, the region W30 and W20 represent the zoom in title bar and a part of the main window, respectively. This is advantageous when the pointer should be located at one of small buttons on title bar in extremely high resolution display status. Then the pointer P may be moved exactly to the desired position on the button B30. When the mouse button is clicked, the zoom in window will disappear as shown in FIG. SD and the pointer P is located in position of the desired button B30 to carry out desired mouse function.

Figure 6:
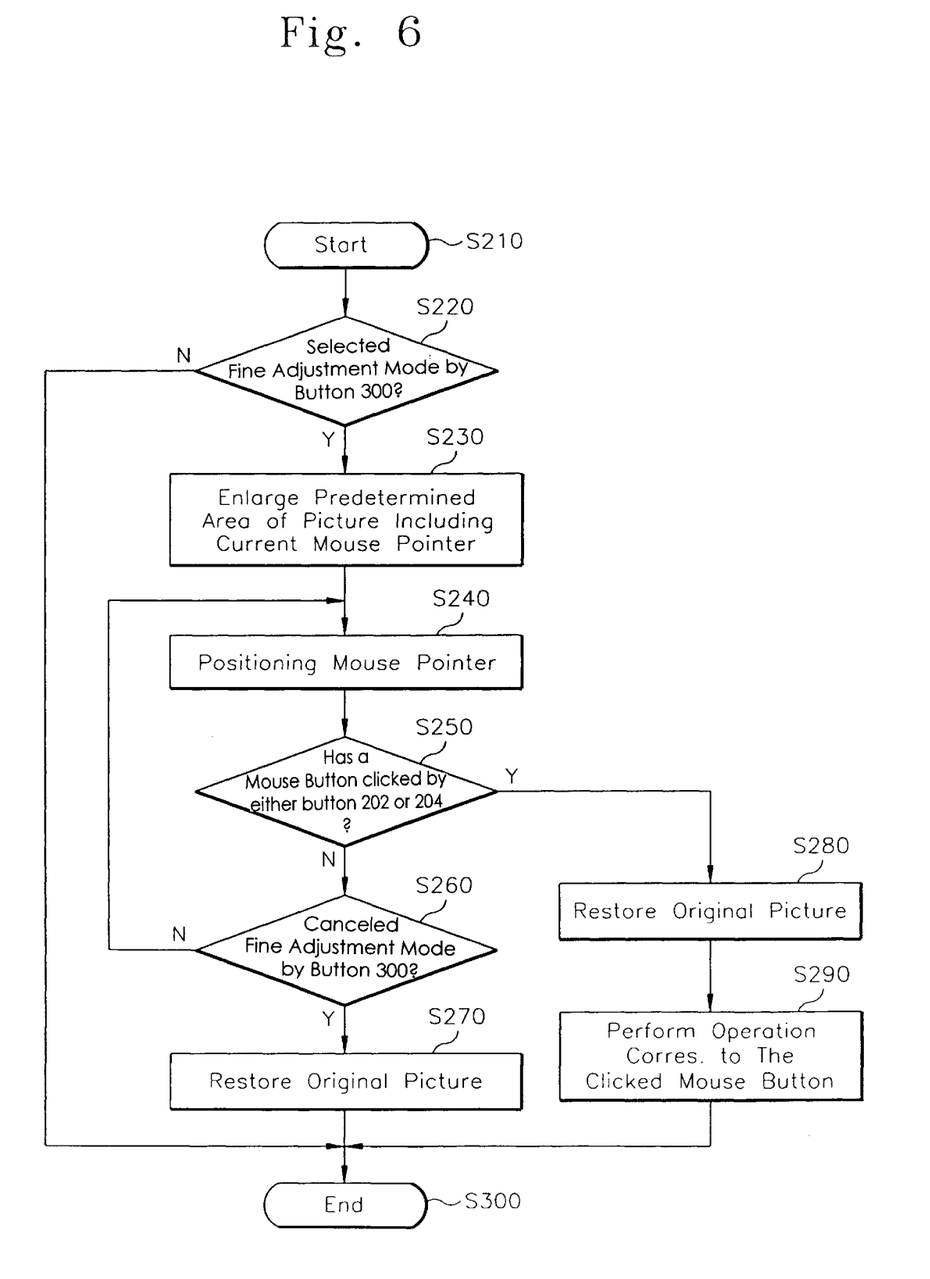
FIG. 6 is a flow chart representing operation of the pointer fine adjustment mode performed in the computer in accordance with another embodiment of the invention.

FIG. 6 shows another embodiment of the invention representing the operation of the pointer fine adjustment mode. As similar to FIG. 4, the fine adjustment mode routine is initiated when the button 300 is pressed. At step 220, a determination is made whether the fine adjustment mode is selected. If the button 300 is pressed, the central processing unit 110 detects the button signal fed from the microcontroller 160 and recognizes the selection of the fine adjustment mode. Then, at step 230, the central processing unit 110 issues a command that urges the video controller 180 to zoom in or enlarge a predetermined screen area including current location of the pointer. Also, in this case, the size of the pointer remains unchanged and maintains its original size.

Then, locating the pointer at the desired position within the enlarged screen is possible at step 240. Once the pointer is moved to the desired position, a determination is made whether a mouse button 202 or 204 has clicked at step 250. If mouse button 202 or 204 has clicked, for example, the zoom in window is restored to original picture at step 280, and subsequently performs corresponding function at step 290. If it is found that a mouse button has not been clicked at step 250, the central processing unit 110 then checks if the fine adjustment mode has canceled at step 260 by detecting another signal generated from clicking of the button 300. If the cancel signal has been detected, the central processing unit 110 urges the zoom in screen to be restored to original picture at step 270.

As apparent from foregoing, the present invention provides for a precise and easy control of the mouse pointer in the high resolution graphic mode, without changing the mouse resolution or pointer speed.

While the invention has been described in terms of an exemplary embodiment, it is contemplated that it may be practiced as outlined above with modifications within the spirit and scope of the appended claims. For example, the fine adjustment mode selection button 300 can be implemented by designating a function key or a special key combination in a common keyboard. Also, it can be configured that the fine adjustment mode is selected in the menu invoked when the mouse right button is clicked.

What is claimed is:

1. In a computer system comprising:

a graphic display apparatus for visually displaying variable images representing graphic data in a predetermined graphic mode while providing a variable visual display of symbols and images in a variable visual graphic display;

a pointing device for moving a position of a pointer within said graphic display in response to a physical manipulation of a pointing device; and a central processing unit to which said graphic display apparatus and said pointing device and operatively coupled;

the improvement comprising:

a function key responding to manual manipulation by selecting and deselecting a pointer fine adjustment mode of said graphic display apparatus by presenting a representation formed by superimposition of said pointer upon said graphic display with said pointer being superimposed upon an enlargement of each region of said graphic display within a vicinity of the pointer as said pointer travels around said graphic display;

a microcontroller responding to said function key to generate an output signal representing that said pointer fine adjustment mode is being selected and deselected; and a means for causing said central processing unit to respond to said output signal by generating a command driving said graphic display apparatus to visually display said representation.

2. The computer system as claimed in claim 1, wherein the pointing device is a touch pad.

3. The computer system as claimed in claim 2, wherein the function key is mounted to one side of the pointing device.

4. The computer system as claimed in claim 1, wherein the size of the pointer in the enlarged screen remains unchanged.

5. In a method of locating a mouse pointer precisely on a display screen, said method comprising the steps of:

(1) determining whether a fine adjustment mode selection key is pressed;

(2) zooming in a predetermined screen area in the vicinity of a current location of the pointer based on the corresponding video driver and operating system and enlarging all images and symbols located within said predetermined screen area;

(3) locating the pointer at the desired position within the zoom in screen;

(4) checking if the fine adjustment mode has canceled; and (5) restoring the zoom in screen to original picture if the fine adjustment mode is canceled.

6. The method of claim 5, the cancellation of the fine adjustment mode being performed by detecting the signal fed from a mouse button.

7. A method of precisely locating a mouse pointer on a display screen, said method comprising the steps of:

(1) selecting fine adjustment mode by determining whether a first button has been pressed;

(2) automatically zooming in on an area of the display screen in the vicinity of the mouse pointer;

(3) positioning the pointer to a desired location within said zoomed in area;

(4) determining whether a second or a third mouse button has been pressed;

(5) restoring the original display to the display screen when either of said second or said third button has been depressed; and (6) performing an operation corresponding to a selected function when either said second or said third mouse button has been depressed.

8. The method of claim 7, further comprising:

determining whether said first button has been depressed when said second or said third button has not been depressed; and restoring the original display on the display screen when said first button has been depressed.

9. The method of claim 8, further comprising:

positioning the pointer to a desired location within said zoomed in area when neither said first button or said second or said third button have been depressed.

10. The computer system of claim 1, comprised of said pointer appearing with substantially identical size in both said graphic display and in said representation.

11. The computer system of claim 1, comprised of any of said symbols and images within said vicinity appearing with substantially different sizes in said graphic display and in said representation.

* * * * *